UNITED STATES PATENT OFFICE.

RICHARD ESCALES AND MILANO NOVAK, OF MUNICH, GERMANY.

MANUFACTURE OF EXPLOSIVES.

No. 915,165.  Specification of Letters Patent.  Patented March 16, 1909.

Application filed October 16, 1907. Serial No. 397,722.

*To all whom it may concern:*

Be it known that we, RICHARD ESCALES and MILANO NOVAK, citizens of Germany and Austria-Hungary, respectively, residing at Munich, Bavaria, Germany, have invented certain new and useful Improvements in the Manufacture of Explosives; and we do hereby declare the following to be a full, clear, and exact description of the invention, such as will enable others skilled in the art to which it appertains to make and use the same.

In order to reduce the freezing point of nitro-glycerin and of the explosives manufactured from the same, it has been customary to add to the former various admixtures, such as nitrobenzol, dinitroglycerin, nitrated chlorhydrin etc., which can in many cases be manufactured together with the nitroglycerin.

The present invention relates to the manufacture of explosives having a low freezing point and containing nitro-glycerin from material obtained according to a process which may be considered as a modification of the Lourenzo method (see *Liebig's Annalen*, Vol. 119, page 228) for the isolation of glycerin or polyglycerin condensed with hydrochloric acid. This process consists in mixing one part of glycerin with about $\frac{1}{16}$ to $\frac{1}{5}$ part by weight of water or of a watery solution of hydrochloric acid not exceeding $\frac{1}{5}$ of the weight of glycerin present, whereupon a stream of hydrochloric acid is passed through the liquid for several hours at a temperature of about 100° centigrade; to the mixture is then added an equal quantity of glycerin and the product thus obtained is subjected to a temperature of about 110° centigrade for about 20 to 24 hours. This heating serves to produce a number of condensation products of glycerin and of glycerin with hydrochloric acid. Heating is conveniently performed under an ordinary reflux condenser.

Instead of diluting strong glycerin or what is known as "dynamite glycerine" (specific gravity 1.262) with water, it is also possible to use diluted glycerin already containing the desired quantity of water. Also, instead of adding an approximately equal quantity of glycerin to the diluted glycerin before condensation and after the stream of hydrochloric acid has been passed through under a temperature of about 100°, it is permissible to add smaller quantities of glycerin or the condensation can be immediately undertaken without further addition of glycerin. After condensation any remaining free hydrochloric acid, which might be harmful during the following nitrating of the products of condensation, may be expelled by heating to 150° or 160° centigrade. It is also possible to saturate the ordinary dynamite glycerin of specific gravity 1.262—without any dilution—with gaseous hydrochloric acid during several hours or to the desired point of saturation and then condense at about 150° centigrade.

During the condensation of the glycerin, with itself and with the hydrochloric acid a product is formed, containing besides unaltered glycerin, the following substances: (1.) monochlorhydrin, (2.) dichlorhydrin, (3.) diglycerin, (4.) chlorhydrin of diglycerin, (5.) triglycerin, (6.) chlorhydrin of triglycerin. This mixture is now subjected to the ordinary process of nitration, during which, besides the trinitroglycerin, also the nitrates of the above-mentioned compositions are formed, of which more especially the various nitrochlorhydrins cause the mixture to assume a low freezing point. According to the longer or shorter time that the stream of hydrochloric acid acts upon the glycerin, and according to the duration of the condensation, it is possible to obtain, after the subsequent nitration, explosives (nitro-glycerin) of a correspondingly varying freezing point. Any of the ordinary processes of nitration may be employed in converting the product so obtained into a non-freezing nitro-explosive. For instance such product may be nitrated at a low temperature by the action of a mixture of nitric and sulfuric acids, using one part of strong nitric acid and two parts of strong sulfuric acid for every one part of such product, said product being gradually added to the acid mixture under constant stirring, and the nitrated product finally washed well with cold water.

What we claim as our invention and desire to secure by Letters Patent, is:—

1. The process of producing a nitro-explosive of low freezing point, which consists in nitrating a mixture of glycerin with polyglycerins and chlorhydrin compounds of mono-glycerin and polyglycerins.

2. The process of producing a nitro-explosive compound of low freezing point, which consists in submitting glycerin to the action of water and hydrochloric acid at substantially 100° centigrade, adding to the product thus obtained a substantially equal quantity of glycerin and heating to substantially 110° centigrade, removing the remainder of free hydrochloric acid and then nitrating the resultant condensation product.

In testimony whereof we hereunto affix our signatures in the presence of two witnesses.

RICHARD ESCALES.
MILANO NOVAK.

Witnesses:
LOUIS F. MUELLER,
ABRAHAM SCHLESINGER.